United States Patent
Lu et al.

(10) Patent No.: US 12,487,948 B2
(45) Date of Patent: Dec. 2, 2025

(54) MEMORY DIE INTERCONNECTIONS TO PHYSICAL LAYER INTERFACES

(71) Applicant: Micron Technology, Inc., Boise, ID (US)

(72) Inventors: Yang Lu, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/540,427

(22) Filed: Dec. 14, 2023

(65) Prior Publication Data

US 2024/0202145 A1    Jun. 20, 2024

Related U.S. Application Data

(60) Provisional application No. 63/476,057, filed on Dec. 19, 2022.

(51) Int. Cl.
*G06F 13/16* (2006.01)
*G06F 13/42* (2006.01)

(52) U.S. Cl.
CPC ...... *G06F 13/1684* (2013.01); *G06F 13/1689* (2013.01); *G06F 13/4234* (2013.01)

(58) Field of Classification Search
CPC ............. G06F 13/1684; G06F 13/1689; G06F 13/4234

USPC .......................................................... 710/305
See application file for complete search history.

(56) References Cited

U.S. PATENT DOCUMENTS

| | | | |
|---|---|---|---|
| 11,048,651 B2 * | 6/2021 | Cheng | G11C 7/1093 |
| 11,048,654 B2 * | 6/2021 | Chen | G06F 13/1689 |
| 12,235,783 B2 * | 2/2025 | Verna-Ketel | G06F 13/4027 |
| 12,260,098 B2 * | 3/2025 | Lu | G06F 3/0679 |
| 2012/0191943 A1 * | 7/2012 | Ware | G11C 7/22 |
| | | | 711/E12.001 |
| 2024/0078202 A1 * | 3/2024 | Suh | G06F 13/1684 |

* cited by examiner

*Primary Examiner* — Brian T Misiura
(74) *Attorney, Agent, or Firm* — Colby Nipper PLLC

(57) ABSTRACT

This disclosure describes aspects of memory die interconnections to physical layer interfaces (PHYs) that may enable expanded channel bus width and improved signal integrity (SI). In aspects, a memory die is operably coupled to a first PHY via a command-and-address (CA) bus and data input/output (DQ) bus of the first PHY and to a second PHY via a chip select (CS) bus of the second PHY. The second PHY may provide a CS signal to the memory die, and the first PHY can perform a training procedure via CA signaling or DQ signaling. The training procedure may improve SI between the memory die and the PHYs. Additionally, a memory die may be interconnected to different PHYs to expand a channel bus width. Thus, by interconnecting memory dies to one or more PHYs as described herein, improved SI and expanded channel bus width can be achieved.

20 Claims, 10 Drawing Sheets

MEMORY DIE INTERCONNECTIONS TO PHYSICAL LAYER INTERFACES

CROSS-REFERENCE TO RELATED APPLICATION(S)

This application claims priority to U.S. Provisional Patent Application Ser. No. 63/476,057 filed on Dec. 19, 2022, the disclosure of which is incorporated by reference herein in its entirety.

BACKGROUND

A modern computing system can utilize a 64-bit processor to process data and instructions in chunks of 64 bits. The processor may be paired with a 64-bit channel by which it acquires these chunks of data and instructions. The modern computing system can include a 64-bit channel controller (CC) as part of or separate from the processor. In various implementations, the CC includes memory controllers (MCs) and physical layer interfaces (PHYs). The system may further include, especially in battery-powered implementations (e.g., smartphones), a 64-bit low-power double data rate five (LPDDR5) memory device coupled to the channel.

Given that current LPDDR5 protocol supports 16 bits per channel, a memory device can be configured with four ×16 LPDDR5 memory dies in parallel to achieve the 64 bits necessary to fully utilize the 64-bit channel. When connected in parallel, however, the memory dies receive the same control signaling, which prevents control of an individual memory die. Accordingly, when training a memory channel that includes memory dies connected in parallel, signaling paths for multiple memory dies are trained together or as one combined memory bus (e.g., 32-bit channel of two memory dies). As such, the combined training of the multiple memory dies often results in suboptimal characterization and reduced signal integrity for the respective signaling paths of each individual memory die (e.g., 16-bit channels of each memory die), which can degrade performance of the memory device.

BRIEF DESCRIPTION OF THE DRAWINGS

Techniques for and apparatuses of memory die interconnections to physical layer interfaces (PHYs) are described with reference to the following drawings, in which same numbers may be used throughout to reference like features or components.

DETAILED DESCRIPTION

Overview

Figure 1:
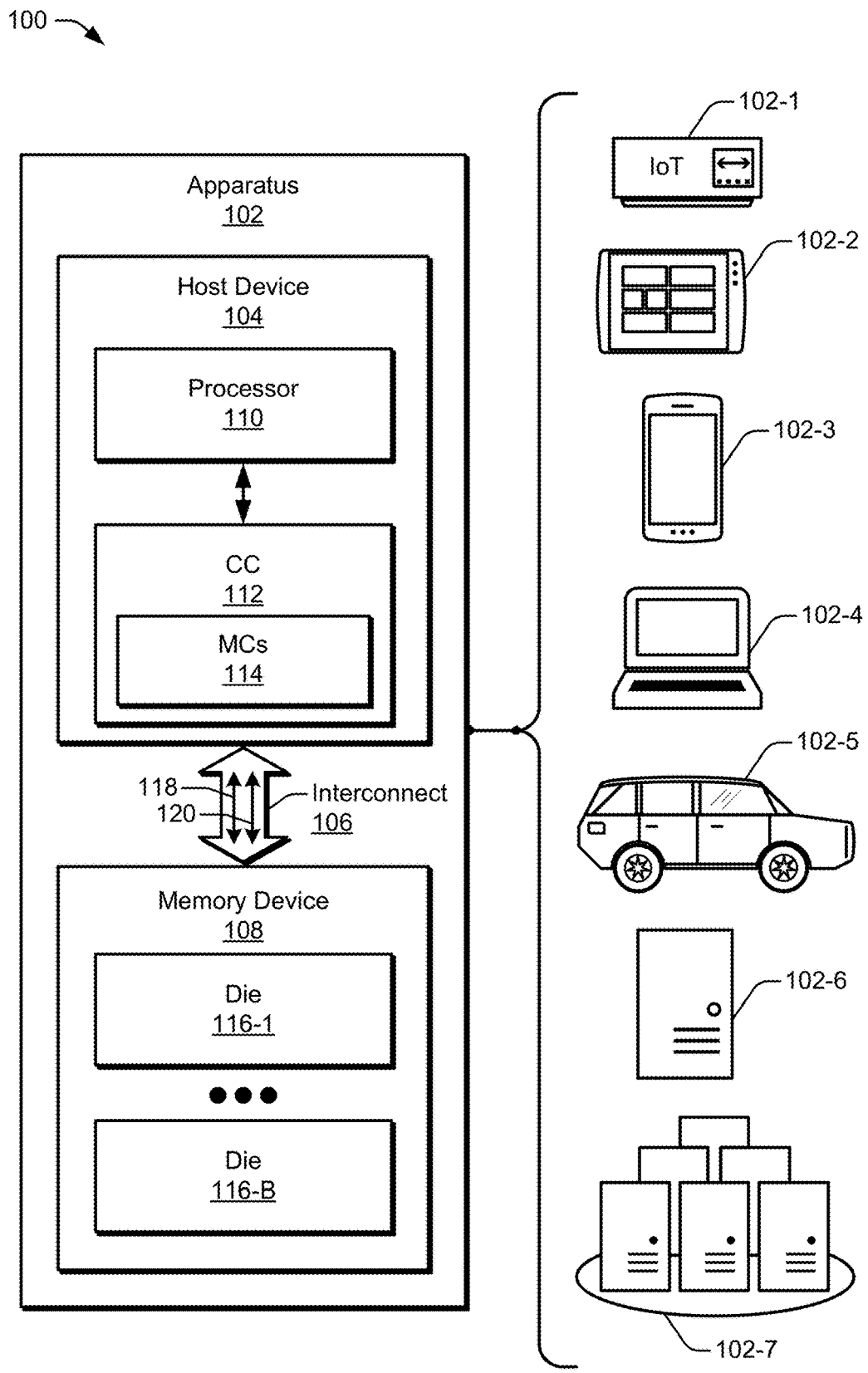
FIG. 1 illustrates example apparatuses in which aspects of memory die interconnections to PHYs can be implemented.

Processors and memory work in tandem to provide features to users of computers and other electronic devices. In some applications, processors can be operably coupled with wide channels, such as 64-bit channels, to process data and instructions in 64-bit chunks. These same applications can also benefit from utilizing a low-power memory device, such as a low-power double data rate five (LPDDR5) memory device, to conserve power and preserve battery life. This benefit is especially significant in modern, mobile computing systems (e.g., smartphones, laptops, tablets).

In a battery-powered 64-bit computing system, for example, the system can include a 64-bit channel controller (CC). The CC may include multiple memory controllers (MCs) and multiple respective physical interface layers (PHYs). The MCs and PHYs can be any bit width, including 8 bits, 16 bits, 32 bits, and the like, depending on a specific application of the computing system. In a specific example, the computing system may further include an LPDDR5 memory device operably coupled to the 64-bit channel. The current LPDDR5 protocol, however, supports just 16 bits per channel, such as for signal training or bus characterization procedures. Thus, various configurations of channel controllers and memory dies have been attempted to improve memory channel characterization and signal integrity.

For example, a channel controller can include one 16-bit MC and one 16-bit PHY (four total) for training each memory die. In such implementations, the four MCs and respective four PHYs consume valuable real estate on the channel controller. In another implementation, the CC may be configured with one 32-bit MC and one 32-bit PHY (two total) for training every two memory dies. In this implementation, real estate for the memory controller and PHY on the channel controller is reduced (one 32-bit MC/PHY is smaller than two 16-bit MCs/PHYs), but signal integrity is sacrificed when training two memory dies in parallel (e.g., two memory dies trained by one MC/PHY receive the same training commands). As such, the concurrent or parallel training of multiple memory dies often results in suboptimal characterization and reduced signal integrity for the respective signaling paths of each individual memory die (e.g., 16-bit channels of each memory die), which can degrade performance of the memory device.

In contrast to preceding techniques, aspects of memory die interconnections to physical layer interfaces as described herein may enable control of individual memory dies. In some implementations, to achieve improved signal integrity (SI), each memory die of the memory device is trained individually. To be trained individually, the described aspects enable memory dies receive unique commands and addresses during a training procedure. For example, a 64-bit CC can be configured with two 32-bit MCs and two 32-bit PHYs, which consume less real estate than four 16-bit MCs and four 16-bit PHYs. Further, the two 32-bit PHYs may each be operably coupled to two of the four LPDDR5 memory dies of the memory device via a chip select (CS) bus and a command-and-address (CA) bus in a multiplexed manner.

By way of example, to describe the multiplexed manner of the coupling between the two PHYs and the memory dies, let the two PHYs include a first PHY and a second PHY, and the four memory dies include a first memory die, a second memory die, a third memory die, and a fourth memory die. In various aspects, the first PHY is operably coupled (e.g., electrically and/or communicatively coupled) to the first memory die and the second memory die via the CA bus of the first PHY. Additionally, the first PHY is operably coupled to the first memory die via the CS bus of the first PHY. However, the first PHY is operably coupled not to the second memory die but to the fourth memory die via the CS bus of the first PHY. The second PHY is operably coupled to the third memory die and the fourth memory die via the CA bus of the second PHY. Also, the second PHY is operably coupled to the second memory die and the third memory die via the CS bus of the second PHY.

From a point of view of the memory dies, the first memory die is operably coupled to the first PHY via the CA bus and the CS bus of the first PHY. The second memory die is operably coupled to the first PHY via the CA bus of the first PHY and is operably coupled to the second PHY via the CS bus of the second PHY. The third memory die is operably coupled to the second PHY via the CA bus and the CS bus of the second PHY. The fourth memory die is operably coupled to the second PHY via the CA bus of the second PHY and is operably coupled to the first PHY via the CS bus of the first PHY. During a training or channel characterization procedure, the first PHY may enable the first memory die and the fourth memory die to receive commands and addresses by asserting a CS signal via the CS bus of the first PHY. Further, the first PHY may assert a CA signal via the CA bus of the first PHY, which may be received by the first memory die operably coupled to the first PHY via the CA bus of the first PHY. The CA signal received by the first memory die via the CA bus of the first PHY may include commands and addresses that instruct the first memory die to perform a training procedure.

Although the fourth memory die is enabled to receive commands and addresses by the CS signal asserted via the CS bus of the first PHY, it does not perform a training procedure because it is not operably coupled to the first PHY via the CA bus of the first PHY. Rather, the fourth memory die is operably coupled to the second PHY via the CA bus of the second PHY. The second PHY may assert a CA signal via the CA bus of the second PHY, which may be received by the fourth memory die operably coupled to the second PHY via the CA bus of the second PHY. The CA signal received by the fourth memory die via the CA bus of the second PHY may include commands and addresses that instruct the fourth memory die to perform a no-operation or deselect procedure. In this way, real estate of the 64-bit CC may be conserved by including two 32-bit MCs and two 32-bit PHYs, which are smaller than four 16-bit MCs and four 16-bit PHYs. Additionally, in this way, the 64-bit CC may achieve improved SI by training each memory die individually via the interconnections of the memory dies to the PHYs via the multiplexed manner of the CS bus and the CA bus as described herein. The multiplexed manner of the memory die interconnections to PHYs is described throughout this disclosure, along with example memory types and devices in which the aspects may be implemented.

In aspects, the described memory die interconnections to PHYs can be implemented with a variety of memory system configurations. For example, processors and memories can be secured to a printed circuit board (PCB), such as a rigid or flexible motherboard. The PCB can include sockets for accepting one or more components, including at least one processor and one or more memories. Some PCBs include multiple sockets that are each shaped as a linear slot and designed to accept a dual in-line memory module (DIMM) or a small outline DIMM (SODIMM). These sockets can be fully occupied by DIMMs or SODIMMs while a processor is still able to utilize more memory. In such situations, greater performance is feasible if additional memory is available to the processor. Further, wiring infrastructure that enables communication between two or more components (e.g., processors and memories) can also be disposed on at least one layer of the PCB.

PCBs may also include at least one peripheral component interconnect (PCI) express (PCIe® or PCI-E®) slot. A PCIe slot is designed to provide a common interface for various types of components that may be coupled to a PCB. Compared to some older standards, PCIe can provide higher rates of data transfer or a smaller footprint on the PCB, including both greater data transfer rates and smaller size. Accordingly, certain PCBs enable a processor to access a component (e.g., a memory device, a sound card, a video-processing card) that is connected to the PCB via a PCIe slot.

In some cases, accessing a memory device or other component solely using a PCIe protocol may not offer as much functionality, flexibility, or reliability as desired. In such cases, another protocol, such as the Compute Express Link™ (CXL) protocol, may be layered on top of the PCIe protocol. The CXL protocol is a higher-level protocol that can be implemented over a physical layer that is governed, for instance, by the PCIe protocol. The CXL protocol can provide, for example, a memory-coherent interface that offers high-bandwidth or low-latency data transfers, including data transfers having both high bandwidth and low latency.

The CXL protocol addresses some of the limitations of PCIe links by providing an interface that leverages, for example, the PCIe 5.0 physical layer and electricals while providing lower-latency paths for memory access and coherent caching between processors and memory devices. The CXL protocol can offer high-bandwidth, low-latency connectivity between host devices (e.g., processors, central processing units (CPUs), systems-on-a-chip (SOCs)) and memory devices (e.g., accelerators, memory expanders, memory buffers, input/output (I/O) devices). The CXL protocol also addresses growing high-performance computational workloads by supporting heterogeneous processing and memory systems with potential applications in AI, machine learning, and other high-performance computing environments. With the potential to increase memory density by utilizing improved communication protocols, such as the CXL protocol, memory devices may be specified with additional design constraints that create new challenges for designers of memory devices.

Thus, memory devices may be implemented in different forms and deployed in various environments. For example, multiple memory dies can be secured to a PCB of a motherboard (e.g., directly or as part of a DIMM) or can be enclosed within a CXL memory module, which may likewise be secured to the PCB. The memory dies may include double data rate synchronous DRAM (DDR SDRAM), including low-power DDR (LPDDR) SDRAM, such as LPDDR5. Under the LPDDR5 standard, memory densities may be so high that multiple dies are packaged together in a multiple-die package or multiple single-die packages are secured to a CXL module.

Although some implementations of memory die interconnections to PHYs are described herein in terms of a CXL memory module, the memory module can be any memory module, such as a single in-line memory module (SIMM), a DIMM, or another memory device. Further, although some implementations are described herein in terms of a 64-bit CC, a 64-bit channel, and four ×16 LPDDR5 memory dies, the CC and respective channel can be any width, including 16 bits, 32 bits, 64 bits, 128 bits, 256 bits, and so forth. Accordingly, the four ×16 LPDDR5 memory dies may be any configuration, including ×4, ×8, ×16, ×32, ×64, and so forth.

Additionally, the memory dies can be any memory dies, including DDR dies, graphic DDR (GDDR) dies, LPDDR dies, high-bandwidth memory (HBM) dies, hybrid memory cube (HMC) dies, and each of their generational iterations (e.g., DDR5, GDDR6, LPDDR5). The specific configuration of the CC, its respective channel, and the memory device(s) operably coupled to the channel depend on a design consideration for the given computing system and/or memory device.

Example Operating Environments

FIG. 1 illustrates, at 100 generally, example apparatuses 102 in which aspects of a memory die operably interconnected to PHYs can be implemented. The apparatus 102 can be at least one electronic device, implementations of which include an internet-of-things (IOT) device 102-1, a tablet 102-2, a smartphone 102-3, a laptop 102-4, a vehicle 102-5, a server 102-6, a server cluster 102-7 that may be part of a cloud computing infrastructure, and a portion thereof (e.g., a PCB). Other example implementations of the apparatus 102 include a smartwatch, a video dongle, a smart television, a gaming device, a motherboard, a consumer appliance (e.g., a refrigerator), a drone, industrial equipment, a security device, and so forth. Each type of electronic device or other apparatus can include one or more components to provide some computing functionality or feature.

In implementations, the apparatus 102 can include a host device 104, an interconnect 106, and a memory device 108 operably coupled to the host device 104 via the interconnect 106. The host device can include a processor 110 and a channel controller 112 (CC 112) with one or more memory controllers 114 (MCs 114). The memory device 108 may be realized as a CXL module, a DRAM module, including a three-dimensional (3D) stacked DRAM device, such as a high-bandwidth memory (HBM) device or a hybrid memory cube (HMC) device. The memory device 108 may operate as a main memory for a system including the host device 104. In aspects and as illustrated in FIG. 1, the memory device 108 can be formed from multiple memory dies 116-1 through 116-B. Although not shown, the apparatus 102 can include storage, such as a solid-state drive (SSD), a hard disk drive (HDD), a flash memory, or another form of non-volatile memory.

As illustrated in FIG. 1, the processor 110 of the host device 104 may be coupled to the CC 112. In aspects, the host device 104 may include other components (not shown) to provide various functionalities of the host device 104. In some aspects, the processor 110 and other components of the host device 104 form an integrated system, such as a system-on-chip (SoC). The processor 110 may include or comprise a general-purpose processor, a central processing unit (CPU), a graphics processing unit (GPU), a neural network engine or accelerator, an application-specific integrated circuit (ASIC), a field-programmable gate array (FPGA), an integrated circuit (IC), a modem or baseband processor, and so forth. In operation, the CC 112 can provide a high-level or logical interface between the processor 110, other memories coupled to the CC 112 (not shown), and at least one external device (e.g., the memory device 108). The CC 112 can receive commands from the processor 110 and provide them to the memory device 108 with appropriate formatting, timing, reordering, and so forth. The CC 112 can also forward to the processor 110 responses to the commands that the CC 112 receives from the memory device 108.

Regarding connections to the host device 104, the host device can be coupled to the memory device 108 via the interconnect 106. The host device 104 can also be coupled, directly or indirectly (e.g., wirelessly), to the memory device 108 via the interconnect 106. The depicted interconnect 106, as well as other interconnects not shown that communicatively couple together various components, enables data and commands to be transferred between two or more components of the various components. Examples of the interconnect 106 include a bus, a switching fabric, a crossbar, a relay, one or more conductors that carry a voltage or a current signal, and the like. The interconnect 106 can include at least one CA bus 118 and at least one data input/output (DQ) bus 120. Each bus may be implemented as a unidirectional or bidirectional bus. Although not shown, the interconnect 106 may also include a clock bus that is part of or separate from the CA bus 118 or DQ bus 120. The CA bus 118 and the DQ bus 120 may be coupled to CA and DQ pins, respectively, of the memory device 108.

Figure 2:
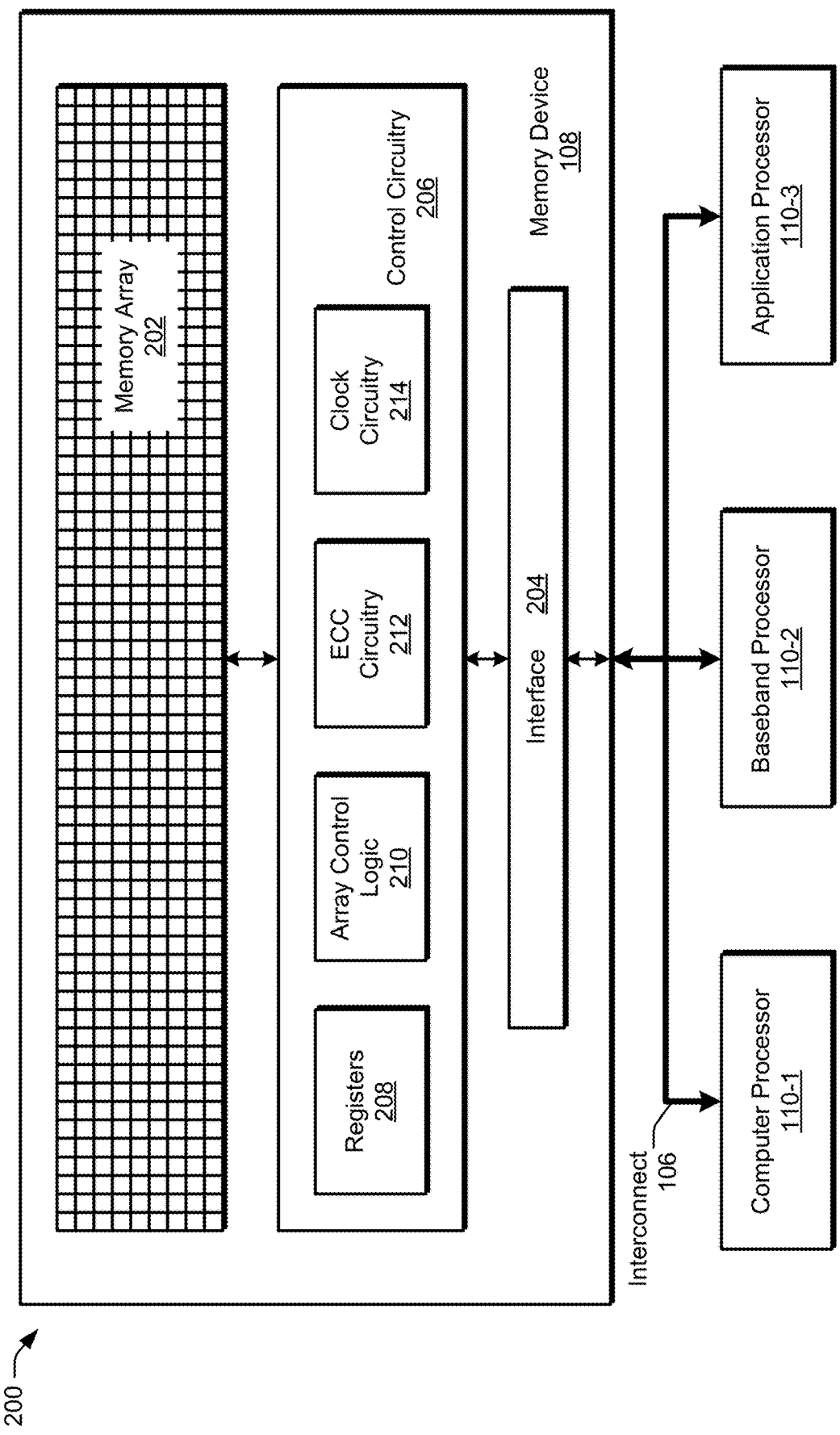
FIG. 2 illustrates an example computing system that includes a memory device in which aspects of memory die interconnection to PHYs can be implemented.

FIG. 2 illustrates an example computing system 200 in which aspects of a memory die operably interconnected to PHYs can be implemented. In implementations, the computing system 200 includes the interconnect 106 configured to couple the memory device 108 with the processor 110. The memory device 108 can include or be associated with at least one memory array 202, at least one interface 204, and control circuitry 206 that is communicatively coupled to the memory array 202. In aspects, the memory device 108 may be configured as a CXL memory device or a memory module (e.g., a dual-channel DIMM) coupled to the interconnect 106 of the computing system 200. The memory device 108 can correspond to one or more of the memory dies 116, a main memory, or a storage memory of the apparatus 102 of FIG. 1. The memory array 202 can include an array of memory cells of DRAM, SDRAM, 3D stacked DRAM, DDR SDRAM, LPDDR SDRAM, or the like. The memory array 202 and the control circuitry 206 may be components of a single semiconductor die or on separate semiconductor dies. The memory array 202 or the control circuitry 206 may also be distributed across multiple semiconductor dies or memory devices, which may be coupled together via the interface 204 or the interconnect 106.

The control circuitry 206 can include a number of components that can be used by the memory device 108 to perform various operations, such as communicating with other devices and performing reads or writes. The control circuitry 206 can include one or more registers 208, at least one instance of array control logic 210, error correction code (ECC) circuitry 212, and clock circuitry 214. The registers 208 may be configured to store information to be used by the control circuitry 206 or another part of the memory device 108. The array control logic 210 may be implemented as circuitry that can provide command decoding, address decoding, input/output (I/O) functions, amplification circuitry, power management circuitry, power control modes, or other functions. The ECC circuitry 212 may be realized as hardware that implements an ECC algorithm or other mechanism for detection or correction of bit errors. Further, the ECC circuitry 212 may be shared among multiple dies 116 of the memory device 108. In aspects, the ECC circuitry 212 can perform single-bit or multi-bit ECC determinations. The clock circuitry 214 may be implemented as circuitry that can provide synchronization of various components of the memory device 108 with one or more external clock signals that may be provided over the interconnect 106 or a clock signal that is generated internally. As examples, the external clock signals can include CA clock signals (e.g., CK_t, CK_c) or data clock signals (e.g., WCK_t, WCK_c).

The interface 204 can operably couple the control circuitry 206 or the memory array 202 directly or indirectly to the interconnect 106. As illustrated in FIG. 2, the registers 208, the array control logic 210, the ECC circuitry 212, and the clock circuitry 214 can be part of a single component (e.g., the control circuitry 206). In other implementations, one or more of the registers 208, the array control logic 210, the ECC circuitry 212, or the clock circuitry 214 may be implemented as separate components, which can be provided on a single semiconductor die or across multiple semiconductor dies. These components of the control circuitry 206 may be individually or jointly coupled to the interconnect 106 via the interface 204.

Example Techniques and Hardware

Figure 3:
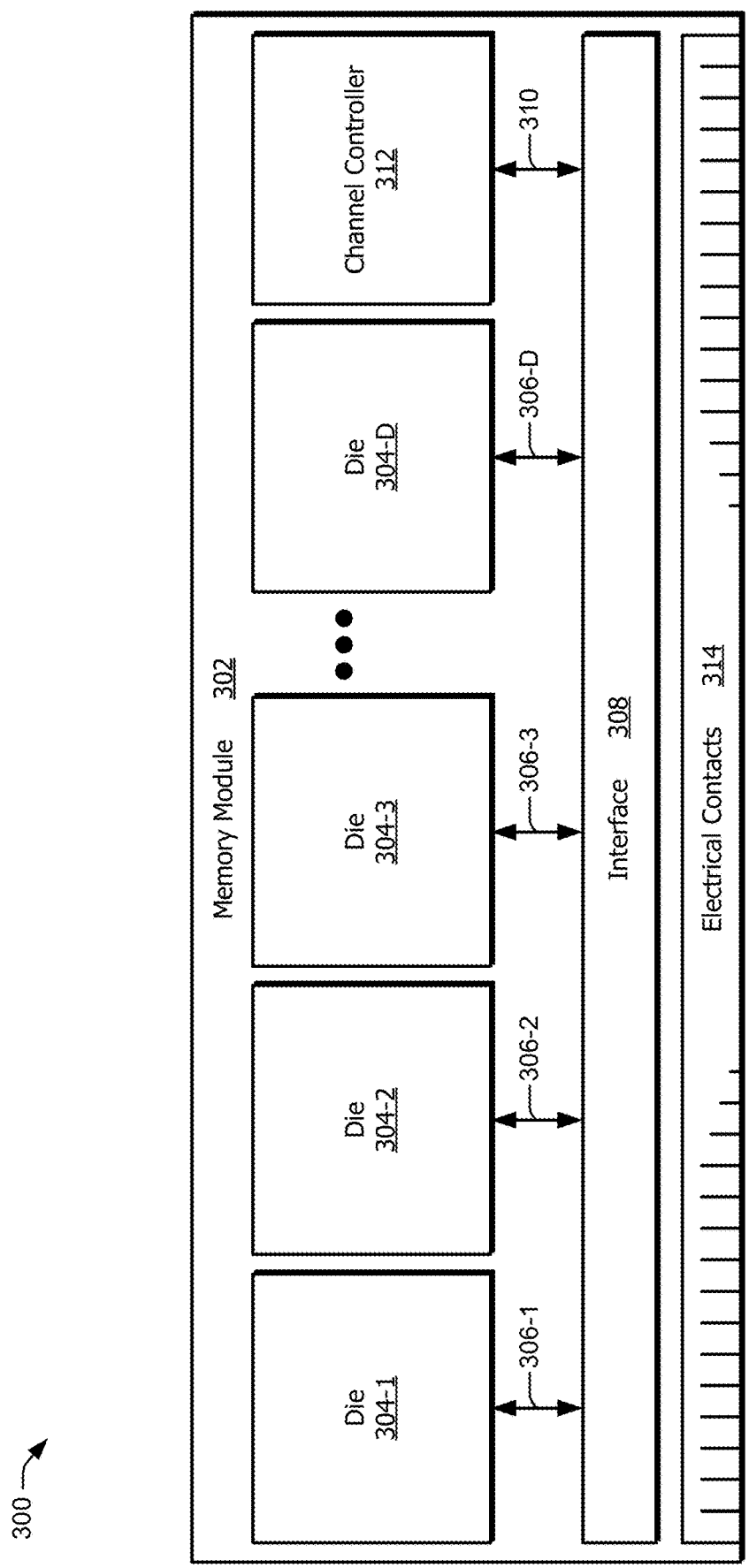
FIG. 3 illustrates an example memory device with a memory die operably interconnected to PHYs in accordance with one or more aspects.

FIG. 3 illustrates, at 300 generally, an example memory device with a memory die operably interconnected to PHYs in accordance with one or more aspects. An example memory module 302 includes multiple memory dies 304, which may be configured similarly to the memory dies 116 described with reference to FIG. 1. As illustrated, the memory module 302 includes a first die 304-1, a second die 304-2, a third die 304-3, . . . , and a $D^{th}$ die 304-D in which 'D' represents a positive integer. The memory module 302 can be realized as a CXL memory module, a SIMM, or a DIMM. The memory dies 304 can be realized as DDR dies, including generational iterations (e.g., DDR2 through DDR5), GDDR dies, HBM dies, LPDDR dies, DRAM dies, SDRAM dies, and so forth. The memory device 108 of FIG. 1 can correspond to any one or more of the memory dies 304, the memory module 302 with at least one die 304, and so forth.

The memory module 302 also can include interconnects 306, an interface 308, an interconnect 310, and a channel controller 312 (CC 312). The interconnects 306 include a first interconnect 306-1, a second interconnect 306-2, a third interconnect 306-3, . . . , and a $D^{th}$ interconnect in which 'D' is a positive integer. The interconnects 306 operably couple the dies 304 to the interface 308. Each interconnect 306 may be a single-bit or multi-bit data or CA bus. The interface 308 may be line traces on a motherboard or PCB. The interconnect 310 operably couples the interface 308 to the CC 312 so that the CC 312 can issue commands to and receive replies from the dies 304 via the interconnect 310, the interface 308, and the interconnects 306. The CC 312 can be included as part of the memory module 302 (as depicted) or be separate from the memory module 302 altogether. Further, although not shown, the CC 312 may include one or more MCs and one or more PHYs. Lastly, the memory module 302 can include electrical contacts 314 (e.g., pins). The electrical contacts 314 can be used to interface the memory module 302 to other components, such as a motherboard or another PCB. Although not shown, the components described herein may be operably coupled to one another via any suitable connection(s) and/or conductor(s), which may include connectors, PCB traces, flexible printed circuits (FPCs), redistribution layers (RDLs), wires, multiconductor cables, bond wires, solder bumps, solder contacts, ball-grid array, pin-grid array, or the like.

The memory module 302 can be configured or implemented in various manners. For example, the memory module 302 may include a PCB, and the multiple dies 304-1 . . . 304 D may be included in a package and mounted or otherwise disposed on the PCB. Alternatively, the memory module 302 may include a die carrier, one or more electrical RDLs, and/or a substrate on which the dies 304 are embodied to form a package. The package can be a single-die (e.g., includes one die) or multi-die (e.g., includes at least two dies) package. The memory dies 304 may be arranged in a line or along two or more dimensions as in a grid or array. In some cases, two or more of the dies 304 may be stacked, with intermediate dies configured to enable signal pass-through or coupling to a substrate, the CC 312, or another die. The dies 304 may be configured with a common size or different sizes, which may depend on a design capacity or architecture of the memory module 302. Each memory die 304 may be like one or more other memory dies 304 or may be unique on the given memory module 302 in terms of size, shape, data capacity, control circuitries, and so forth. Alternatively, or additionally, the dies 304 may be distributed on multiple sides of the memory module 302.

Figure 4:
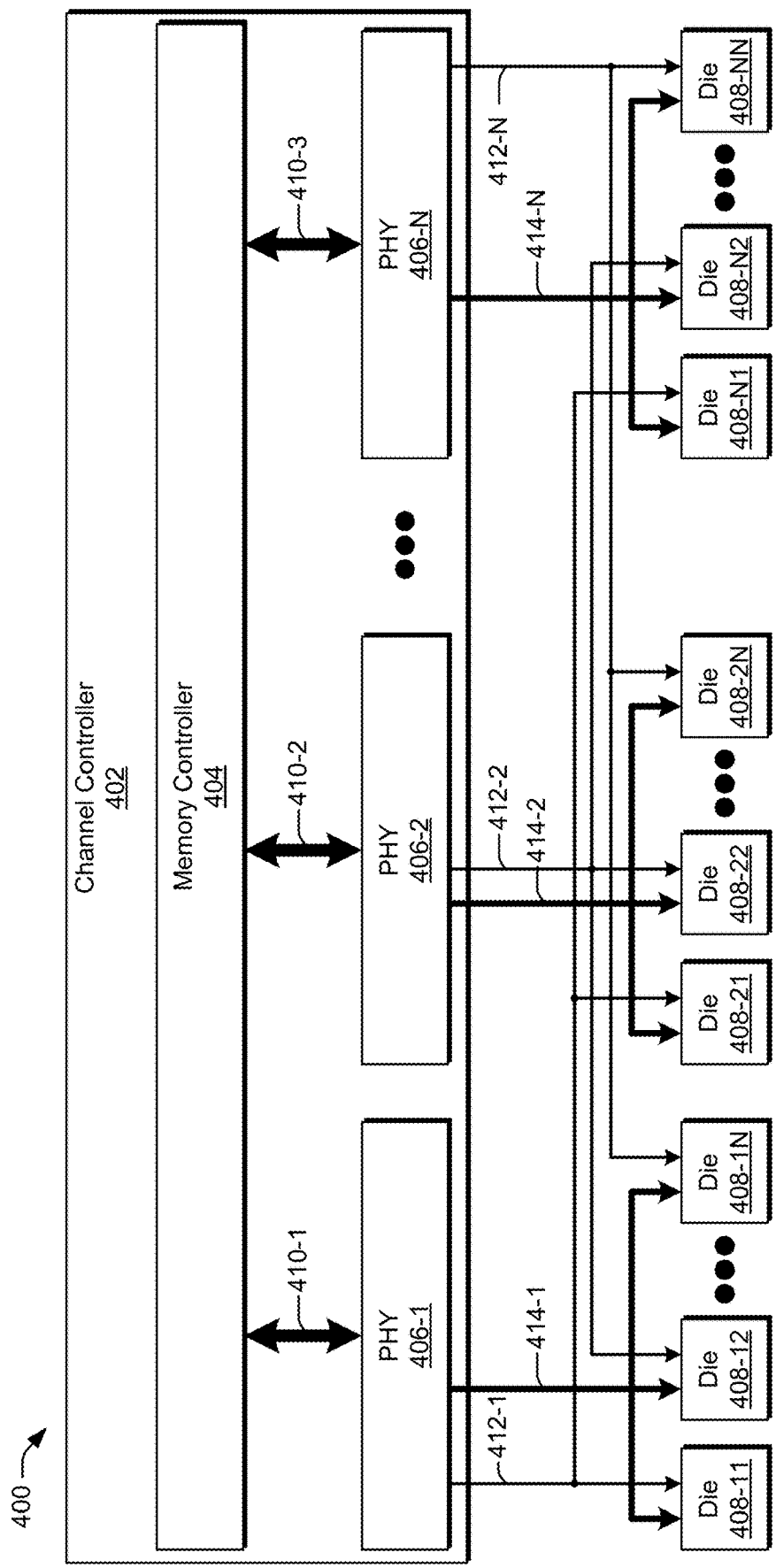
FIG. 4 illustrates an example implementation of a channel controller in accordance with one or more aspects.

FIG. 4 illustrates, at 400 generally, an example implementation of a channel controller in accordance with one or more aspects. A CC 402 can include an MC 404 and multiple PHYs 406. In this implementation, multiple memory dies 408 of a memory device are depicted. The CC 402 can also include multiple interconnects 410 that operably couple the MC 404 to the multiple PHYs 406. A first interconnect 410-1 operably couples the MC 404 to a first PHY 406-1, a second interconnect 410-2 operably couples the MC 404 to a second PHY 406-2, and an $N^{th}$ interconnect 410-N operably couples the MC 404 to an $N^{th}$ PHY in which 'N' is a positive integer. The multiple memory dies 408 are operably coupled to the multiple PHYs 406 of the CC 402 via CS buses 412 and CA buses 414.

FIG. 4 generally illustrates various aspects of memory die interconnections to PHYs of the CC 402, which may be implemented with fewer PHYs 406 and memory dies 408 or scaled to any suitable number of PHYs and memory dies. As illustrated in FIG. 4, sets of the memory dies 408-1, 408-2, and 408-N may be associated with respective ones of the PHYs 406 or operably coupled to the CA buses 414 and/or DQ buses (not shown) of the PHY 406. For example, the set of memory dies that includes the memory die 408-11 through memory die 408-1N is associated with and coupled to PHY 406-1 via the CA bus 414-1. Further, the set of memory dies that includes the memory die 408-21 through memory die 408-2N is associated with and coupled to PHY 406-2 via the CA bus 414-2, and the set of memory dies that includes the memory die 408-N1 through memory die 408-NN is associated with and coupled to PHY 406-N via the CA bus 414-N. With reference to interconnections of the individual memory dies 408 to the PHYs 406, a first memory die 408-11 of the first PHY 406-1 is operably coupled to the first PHY 406-1 via a CS bus 412-1 and a CA bus 414-1 of the first PHY 406-1. A second memory die 408-12 of the first PHY 406-1 is operably coupled to the first PHY 406-1 via the CA bus 414-1 of the first PHY 406-1 but is not operably coupled to the first PHY 406-1 via the CS bus 412-1 of the first PHY 406-1. Rather, the second memory die 408-12 of the first PHY 406-1 is operably coupled to the second PHY 406-2 via a CS bus 412-2 of the second PHY 406-2. An $N^{th}$ memory die 408-1N of the first PHY 406-1 is operably coupled to the first PHY 406-1 via the CA bus 414-1 of the first PHY but, like the second memory die 408-12, is not connected to the first PHY 406-1 via the CS bus 412-1 of the first PHY 406-1. Rather, the $N^{th}$ memory die 408-1N is connected to the $N^{th}$ PHY 406-N via an $N^{th}$ CS bus 412-N.

Further illustrated in FIG. 4 are a first memory die 408-21, a second memory die 408-22, and an $N^{th}$ memory die 408-2N of the second PHY 406-2. The first memory die 408-21 of the second PHY 406-2 is operably coupled to the second PHY 406-2 via a CA bus 414-2 of the second PHY 406-2 but not the CS bus 412-2 of the second PHY 406-2. Rather, the first memory die 408-21 of the second PHY 406-2 is operably coupled to the first PHY 406-1 via the CS bus 412-1 of the first PHY 406-1. The second memory die 408-22 of the second PHY 406-2 is operably coupled to the second PHY 406-2 via the CS bus 412-2 and the CA bus 414-2 of the second PHY 406-2. The $N^{th}$ memory die 408-2N of the second PHY 406-2 is operably coupled to the second PHY 406-2 via the CA bus 414-2 but, like the first memory die 408-21 of the second PHY 406-2, not the CS bus 412-2 of the second PHY 406-2. Rather, the $N^{th}$ memory die 408-2N of the second PHY 406-2 is operably coupled to the $N^{th}$ PHY 406-N via the $N^{th}$ CS bus 412-N of the $N^{th}$ PHY 406-N.

Lastly, illustrated in FIG. 4 are a first memory die 408-N1, a second memory die 408-N2, and an $N^{th}$ memory die 408-NN of the $N^{th}$ PHY 406-N. The first memory die 408-N1 of the $N^{th}$ PHY 406-N is operably coupled to the $N^{th}$ PHY 406-N via a CA bus 414-N but not the CS bus 412-N of the $N^{th}$ PHY 406-N. Rather, the first memory die 408-N1 of the $N^{th}$ PHY 406-N is operably coupled to the first PHY 406-1 via the CS bus 412-1 of the first PHY 406-1. The second memory die 408-N2 of the $N^{th}$ PHY 406-N is operably coupled to the $N^{th}$ PHY 406-N via the CA bus 414-N but, like the first memory die 408-N1 of the $N^{th}$ PHY 406-N, not the CS bus 412-N of the $N^{th}$ PHY 406-N. Rather, the second memory die 408-N2 of the $N^{th}$ PHY 406-N is operably coupled to the second PHY 406-2 via the CS bus 412-2 of the second PHY 406-2. The $N^{th}$ memory die 408-NN of the $N^{th}$ PHY 406-N is operably coupled to the $N^{th}$ PHY 406-N via the CS bus 412-N and the CA bus 414-N of the $N^{th}$ PHY 406-N.

In the implementation depicted in FIG. 4, each PHY 406 of the N PHYs 406 is operably coupled to a first group of N memory dies 408 via the CS bus 412 of the respective PHY 406. Additionally, each PHY 406 is operably coupled to a second group of N memory dies 408 via the CA bus 414 of the respective PHY 406. As an example, for the first PHY 406-1, the first group of N memory dies 408 operably coupled to the first PHY 406-1 via the CS bus 412-1 of the first PHY 406-1 includes the first memory die 408-11 of the first PHY 406-1, the first memory die 408-21 of the second PHY 406-2, and the first memory die 408-N1 of the $N^{th}$ PHY 406-N. Continuing with the present example, the second group of N memory dies 408 operably coupled to the first PHY 406-1 via the CA bus 414-1 of the first PHY 406-1 includes the first memory die 408-11, the second memory die 408-12, and the $N^{th}$ memory die 408-1N of the first PHY 406-1. In this configuration, the CC 402 can control a maximum of N×N memory dies 408. By so doing, the respective interconnections between the PHYs 406 and memory dies 408 may enable the CC 402 to isolate or control individual ones of the memory dies, such as when implementing training or channel characterization procedures for measuring or calibrating signaling paths between the PHYs and memory dies.

Figure 5:
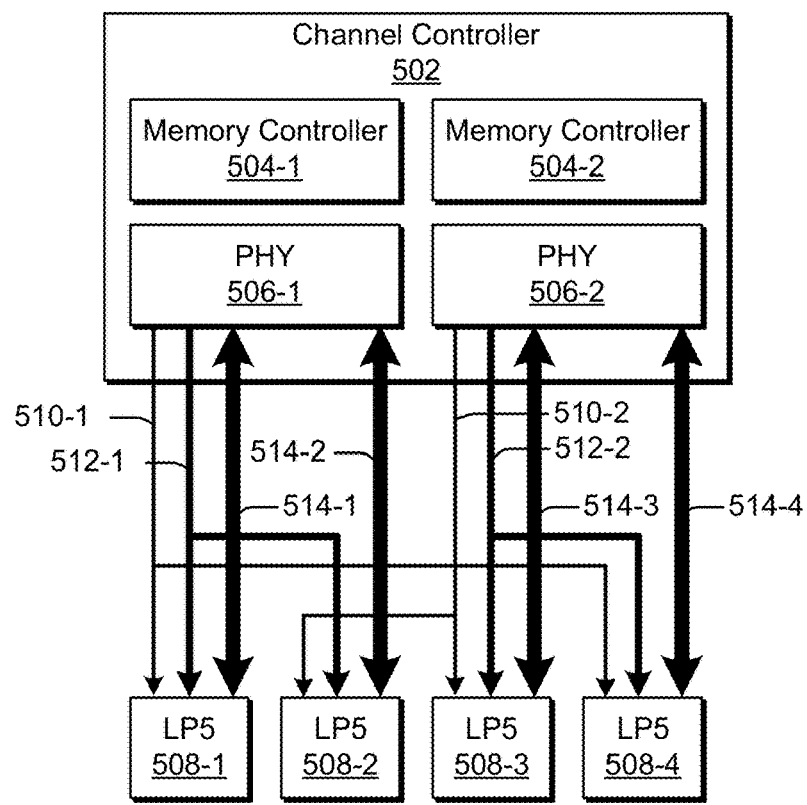
FIG. 5 illustrates an example implementation of a 64-bit channel controller in accordance with one or more aspects.

FIG. 5 illustrates, at 500 generally, an example implementation of a 64-bit CC in accordance with one or more aspects. This implementation can be considered a specific or partial implementation of the CC depicted in FIG. 4. As illustrated, a 64-bit CC 502 includes a first MC 504-1, a second MC 504-2, a first PHY 506-1, and a second PHY 506-2. The MCs 504 can be 32-bit MCs so that combined they add to the 64 bits of the CC 502. Likewise, the PHYs 506 can be 32-bit PHYs so that combined they add to the 64 bits of the CC 502. Also illustrated are LPDDR5 memory dies 508 (LP5s 508), CS buses 510, CA buses 512, and DQ buses 514. The LP5s 508 can be, for example, ×16 LP5s 508 so that combined they add to the 64 bits of the CC 502. The CS buses 510, the CA buses 512, and the DQ buses 514 can be one or more bits wide. Continuing with the present example, the CS buses 510 can be one bit wide, the CA buses 512 can be seven bits wide, and the DQ buses 514 can be 16 bits wide.

As illustrated, the LP5s 508 include a first LP5 508-1, a second LP5 508-2, a third LP5 508-3, and a fourth LP5 508-4. Further, the CS buses 510 include a CS bus 510-1 of the first PHY 506-1 and a CS bus 510-2 of the second PHY 506-2. The CA buses 512 include a CA bus 512-1 of the first PHY 506-1 and a CA bus 512-2 of the second PHY 506-2. Lastly, the DQ buses 514 include a first DQ bus 514-1 and a second DQ bus 514-2 of the first PHY 506-1, as well as a first DQ bus 514-3 and a second DQ bus 514-4 of the second PHY 506-2. The first LP5 508-1 is operably coupled to the first PHY 506-1 via the CS bus 510-1, the CA bus 512-1, and the DQ bus 514-1 of the first PHY 506-1. The second LP5 508-2 is operably coupled to the first PHY 506-1 via the CA bus 512-1 and the second DQ bus 514-2 but not the CS bus 510-1 of the first PHY 506-1. Rather, the second LP5 508-2 is operably coupled to the second PHY 506-2 via the CS bus 510-2 of the second PHY 506-2. The third LP5 508-3 is operably coupled to the second PHY 506-2 via the CS bus 510-2, the CA bus 512-2, and the first DQ bus 514-3 of the second PHY 506-2. The fourth LP5 508-4 is operably coupled to the second PHY 506-2 via the CA bus 512-2 and the second DQ bus 514-4 but not the CS bus 510-2 of the second PHY 506-2. Rather, the fourth LP5 508-4 is operably coupled to the first PHY 506-1 via the CS bus 510-1 of the first PHY 506-1. By so doing, the respective interconnections between the PHYs 506 and LP5s 508 may enable the CC 502 to isolate or control individual ones of the memory dies, such as when implementing training or channel characterization procedures for measuring or calibrating signaling paths between the PHYs and memory dies.

Figure 6:
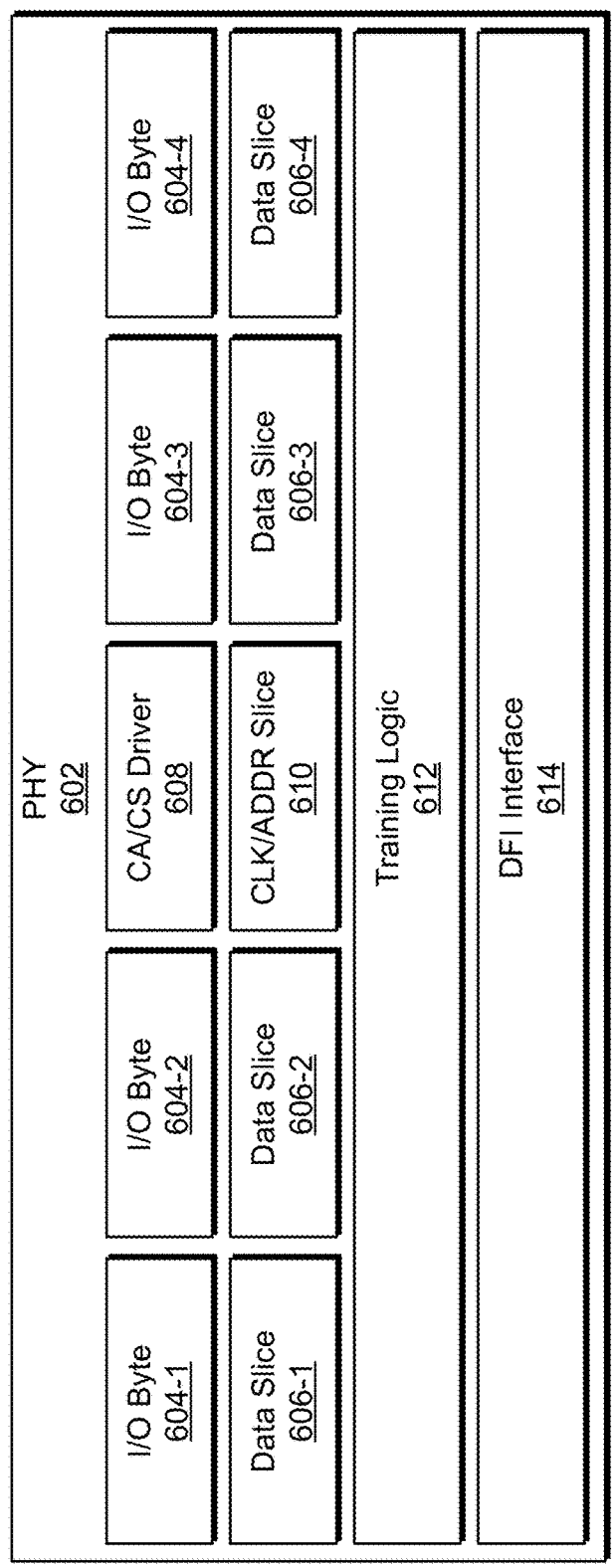
FIG. 6 illustrates an example implementation of a 32-bit PHY in accordance with one or more aspects.

FIG. 6 illustrates, at 600 generally, an example implementation of a 32-bit PHY in accordance with one or more aspects. A PHY 602 can be a 32-bit PHY, such as one of those described with reference to FIG. 5. The PHY 602 can include multiple I/O bytes 604, corresponding multiple data slices 606, a CA/CS driver 608, and a clock-and-address (CLK/ADDR) slice 610. The I/O bytes 604 include a first I/O byte 604-1, a second I/O byte 604-2, a third I/O byte 604-3, and a fourth I/O byte 604-4. The data slices 606 include a first data slice 606-1, a second data slice 606-2, a third data slice 606-3, and a fourth data slice 606-4. The I/O bytes 604 and respective data slices 606 may correspond to bytes of data received from or transmitted to (by the PHY 602) one or more memory dies. For example, the first I/O byte 604-1 and the respective first data slice 606-1 may correspond to a first byte (e.g., eight bits) of data received from or transmitted to the first LP5 508-1 of FIG. 5. Continuing with the present example, the second I/O byte 604-2 and the respective second data slice 606-2 may correspond to a second byte of data received from or transmitted to the first LP5 508-1 of FIG. 5. Although not illustrated in FIG. 6, the CA/CS driver 608 and the CLK/ADDR slice 610 may be operably coupled to a corresponding CA bus, CS bus, and CLK bus. For example, the CA/CS driver 608 may be operably coupled to the CS bus 510-1 and the CA bus 512-1 of the first PHY 506-1 from FIG. 5.

Lastly, the PHY 602 includes training logic 612 and a DDR-to-PHY interface (DFI) 614. The training logic 612 can assist in training various aspects of one or more memory dies (not shown) operably coupled to the PHY 602. For example, the training logic 612 can assist in determining a reference voltage for a CA bus (e.g., VrefCA) or a reference voltage for a DQ bus (e.g., VrefDQ) for a memory die (e.g., LP5 508-1 of FIG. 5) operably coupled to the PHY 602. Additionally, or alternatively, the training logic 612 can assist in determining timing margins or skews for a CLK signal (not shown) of the CLK/ADDR slice 610 of the PHY 602. The DFI 614 may operate in accordance with a latest DFI specification as defined by a DFI group (e.g., the DFI Group). The DFI specification may define an interface protocol between an MC (not shown) and the PHY 602 interfaces that can be implemented by the DFI 614.

Figure 7:
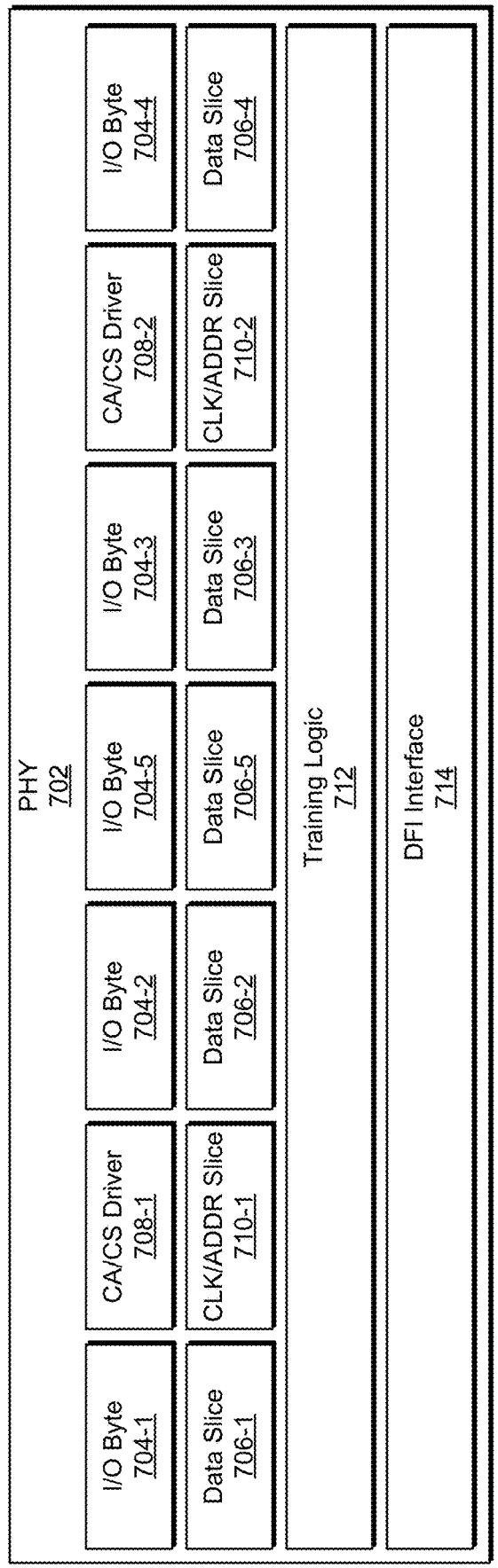
FIG. 7 illustrates an example implementation of a 40-bit PHY in accordance with one or more aspects.

FIG. 7 illustrates, at 700 generally, an example implementation of a 40-bit PHY in accordance with one or more aspects. A PHY 702 can be a 40-bit PHY and include multiple I/O bytes 704, corresponding multiple data slices 706, multiple CA/CS drivers 708, and multiple CLK/ADDR slices 710. The I/O bytes 704 include a first I/O byte 704-1, a second I/O byte 704-2, a third I/O byte 704-3, a fourth I/O byte 704-4, and a fifth I/O byte 704-5. The data slices 706 include a first data slice 706-1, a second data slice 706-2, a third data slice 706-3, a fourth data slice 706-4, and a fifth data slice 706-5. The I/O bytes 704 and respective data slices 706 may correspond to bytes of data received from or transmitted to (by the PHY 702) one or more memory dies. For example, the first I/O byte 704-1 and the respective first data slice 706-1 may correspond to a first byte of data received from or transmitted to a memory die (e.g., the first LP5 508-1 of FIG. 5). Continuing with the present example, the second I/O byte 704-2 and the respective second data slice 706-2 may correspond to a second byte of data received from or transmitted to a same memory die (e.g., the first LP5 508-1 of FIG. 5) or another memory die (e.g., the second LP5 508-2 of FIG. 5). Although not illustrated in FIG. 7, the CA/CS drivers 708 and the CLK/ADDR slices 710 may be operably coupled to corresponding CA buses, CS buses, and CLK buses. For example, the CA/CS driver 708-1 may be operably coupled to the CS bus 510-2 and the CA bus 512-2 of the second PHY 506-2 from FIG. 5.

Lastly, the PHY 702 includes training logic 712 and a DFI interface 714. The training logic 712 can assist in training various aspects of one or more memory dies (not shown) operably coupled to the PHY 702. For example, the training logic 712 can assist in determining a reference voltage for a CA bus or a reference voltage for a DQ bus for a memory die (e.g., LP5 508-3 of FIG. 5) operably coupled to the PHY 702. Additionally, or alternatively, the training logic 712 can assist in determining timing margins or skews for one or more CLK signals (not shown) of the CLK/ADDR slices 710 of the PHY 702. The DFI 714, like the DFI 614 of FIG. 6, may operate in accordance with the latest DFI specification defined by the DFI Group. The DFI specification may define a protocol for interfaces between an MC (not shown) and the PHY 702 that can be implemented by the DFI 714.

Figure 8:
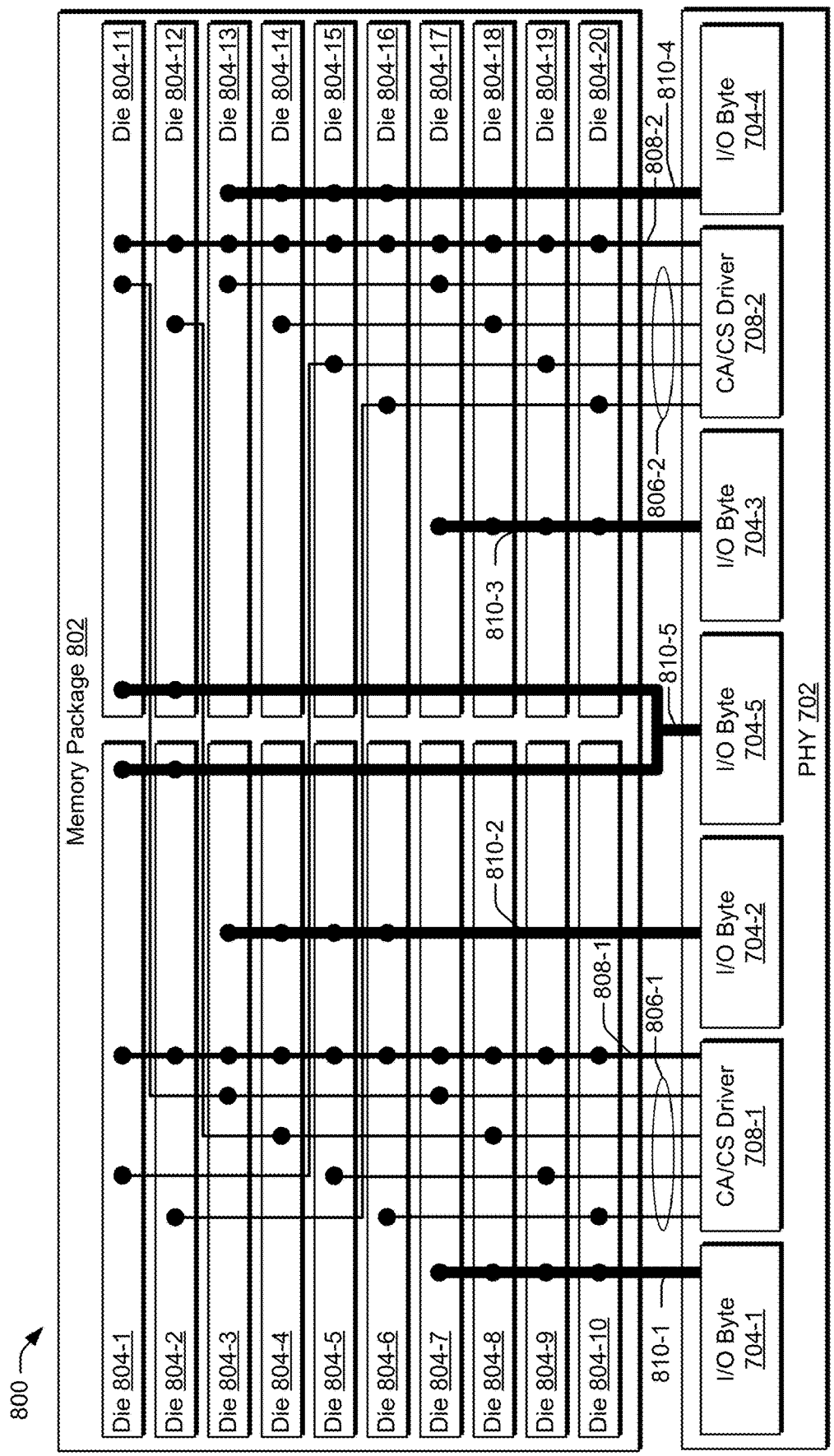
FIG. 8 illustrates an example memory package operably coupled to the 40-bit PHY from FIG. 7.

FIG. 8 illustrates, at 800 generally, an example memory package operably coupled to the 40-bit PHY 702 of FIG. 7. A memory package 802 includes multiple memory dies 804. The memory dies include a first memory die 804-1, a second memory die 804-2, . . . , and a 20th memory die 804-20. Each memory die 804 can be any memory die, such as an LP5 memory die (e.g., LP5 508-1), a GDDR memory die, a DDR die, or the like. The 20 memory dies 804 of the memory package 802 can be operably coupled to the 40-bit PHY 702 from FIG. 7 via CS buses 806, CA buses 808, and DQ buses 810. As illustrated, the data slices 706, CLK/ADDR slices 710, training logic 712, and DFI interface 714 of the PHY 702 are omitted from FIG. 8 for the sake of clarity. The CS buses 806 include a first CS bus 806-1 and a second CS bus 806-2, each of which is four bits wide. Each one of the four bits of the CS buses 806 is illustrated individually for the sake of clarity. The CA buses 808 include a first CA bus 808-1 and a second CA bus 808-2. The DQ buses 810 include a first DQ bus 810-1, a second DQ bus 810-2, a third DQ bus 810-3, a fourth DQ bus 810-4, and a fifth DQ bus 810-5.

As illustrated in FIG. 8, a first 10 memory dies 804-1 through 804-10 are operably coupled to the PHY 702 via the first CA bus 808-1, and a second 10 memory dies 804-11 through 804-20 are operably coupled to the PHY 702 via the second CA bus 808-2. Additionally, a first eight memory dies 804-3 through 804-10 of the first 10 memory dies 804-1 through 804-10 are operably coupled to the PHY 702 via the first CS bus 806-1, while a remaining two memory dies 804-1 and 804-2 are operably coupled to the PHY 702 via the second CS bus 806-2. Further, a first eight memory dies 804-13 through 804-20 of the second 10 memory dies 804-11 through 804-20 are operably coupled to the PHY 702 via the second CS bus 806-2, while a remaining two memory dies 804-11 and 804-12 are operably coupled to the PHY 702 via the first CS bus 806-1.

FIG. 8 further illustrates that a first four memory dies 804-7 through 804-10 of the first 10 memory dies 804 are operably coupled to the PHY 702 via the first DQ bus 810-1. A second four memory dies 804-3 through 804-6 of the first 10 memory dies 804 are operably coupled to the PHY 702 via the second DQ bus 810-2. A remaining two memory dies 804-1 and 804-2 of the first 10 memory dies 804 are operably coupled to the PHY 702 via the fifth DQ bus 810-5. FIG. 8 also illustrates that a first four memory dies 804-17 through 804-20 of the second 10 memory dies 804 are operably coupled to the PHY 702 via the third DQ bus 810-3. A second four memory dies 804-13 through 804-16 of the second 10 memory dies 804 are operably coupled to the PHY 702 via the fourth DQ bus 810-4. A remaining two dies 804-11 and 804-12 of the second 10 memory dies 804 are operably coupled to the PHY 702 via the fifth DQ bus 810-5. In this configuration, the illustrated memory package may implement aspects of memory die interconnections to PHYs, which may enable a CC or other controller to isolate or control individual ones of the memory dies, such as when implementing training or channel characterization procedures for measuring or calibrating signaling paths between the PHYs and memory dies. By so doing, the controller may achieve improved channel training and signal integrity on an individual die basis, which may improve performance of the memory device or memory package.

Example Methods

Figure 9:
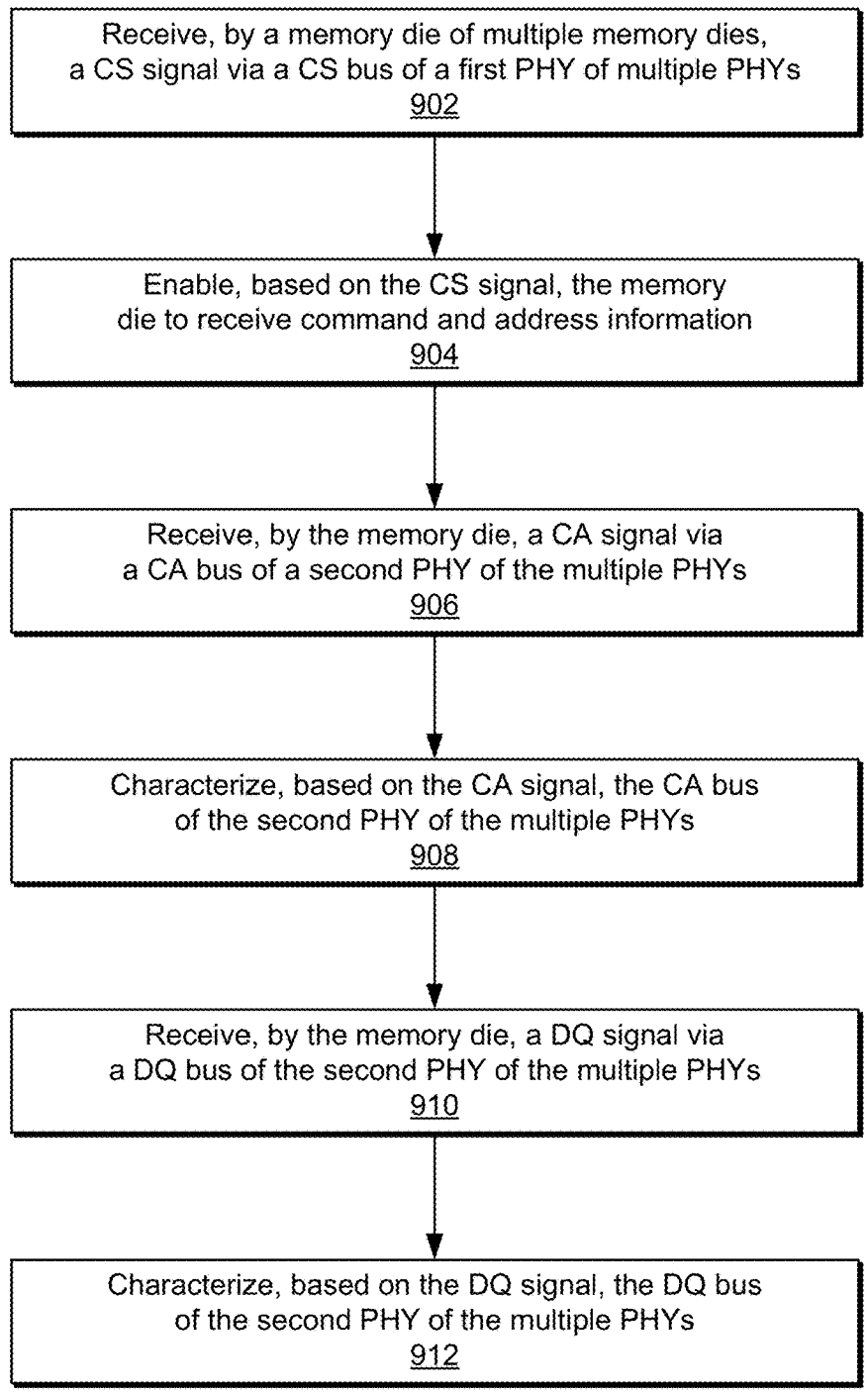
FIG. 9 illustrates an example method for characterizing a command-and-address bus or a data input/output bus of a memory die of multiple memory dies.
Figure 10:
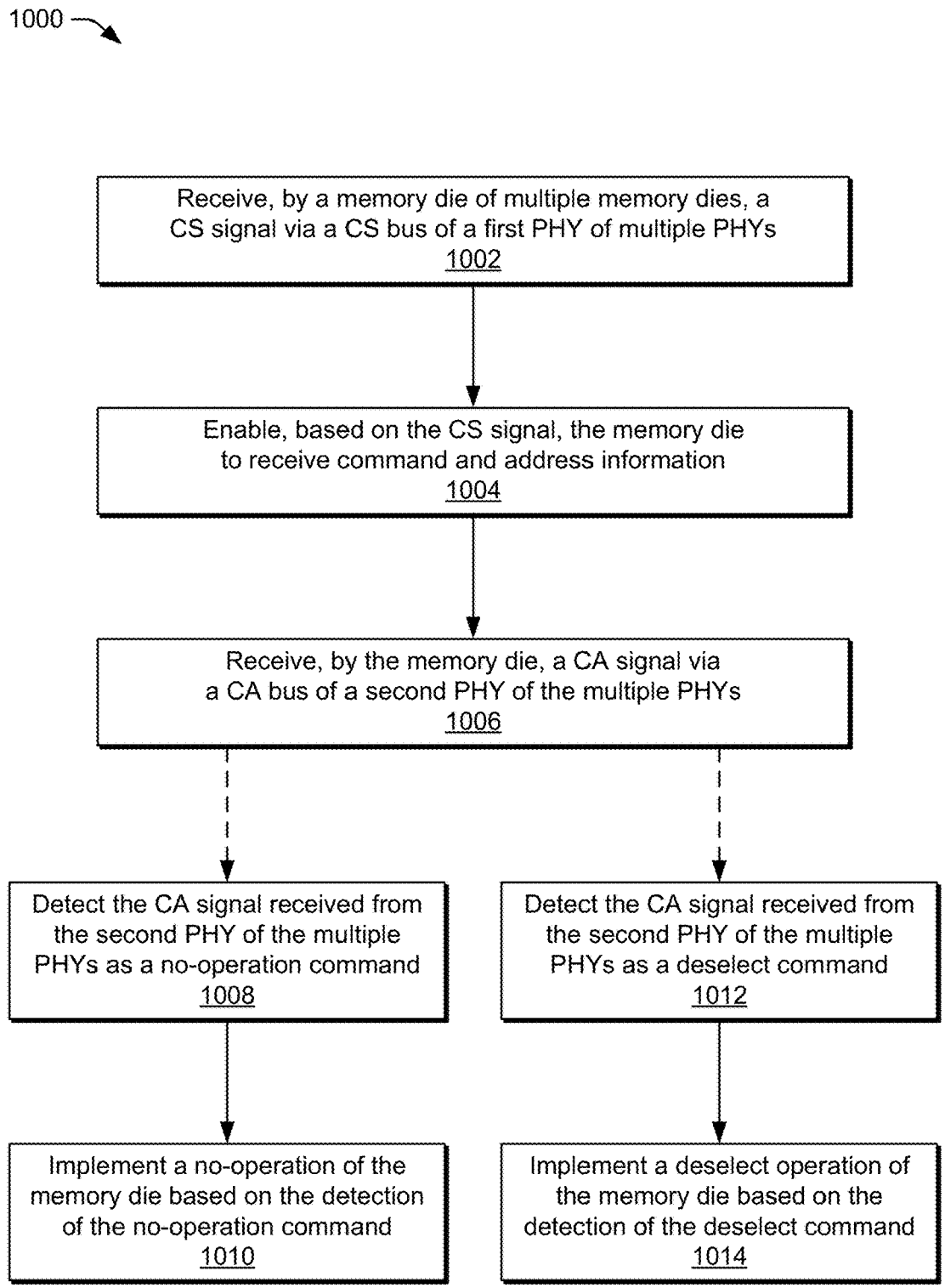
FIG. 10 illustrates an example method for preventing a memory die of multiple memory dies from implementing an operation based on a command-and-address signal.

This section describes example methods 900 and 1000 with reference to FIGS. 9 and 10 for implementing various aspects of memory die interconnections to PHYs. These descriptions may also refer to components, entities, and other aspects depicted in FIGS. 1 through 8, to which reference is made only by way of example.

FIG. 9 illustrates an example method 900 for characterizing a CA bus or a DQ bus of a memory die of multiple memory dies. At 902, a memory die of multiple memory dies receives a CS signal via a CS bus of a first PHY of multiple PHYs. For example, referring to FIG. 4, the memory die 408-21 of the multiple memory dies receives a CS signal via the CS bus 412-1 from the first PHY 406-1 of the multiple PHYs 406. As another example, referring to FIG. 5, the LP5 508-4 of the multiple LP5s 508 receives a CS signal via the first CS bus 510-1 of the first PHY 506-1 of the multiple PHYs 506.

At 904, the memory die is enabled, based on the CS signal, to receive command and address information. The CS signal can be a one-bit signal that enables the memory die, assuming the memory die is configured as an active-high memory die, to receive commands and addresses when the bit is a logical one. Alternatively, if the memory die is configured as an active-low memory die, the one-bit CS signal enables the memory die to receive commands and addresses when the bit is a logical zero. For example, based on the CS signal, the memory die 408-21 may receive command and address information from a controller via the second PHY 406-2 and the CA bus 414-2.

At 906, the memory die receives a CA signal via a CA bus of a second PHY of the multiple PHYs. For example, referring to FIG. 4, the memory die 408-21 of the multiple memory dies 408 receives a CA signal via the second CA bus 414-2 from the second PHY 406-2 of the multiple PHYs 406. As another example, referring to FIG. 5, the LP5 508-4 of the multiple LP5s 508 receives a CA signal via the second CA bus 512-2 from the second PHY 506-2 of the multiple PHYs 506.

At 908, based on the CA signal, the CA bus of the second PHY of the multiple PHYs is characterized. For example, referring to FIG. 4, the CC 402 can characterize (e.g., measure or quantify signaling parameters) or train the second CA bus 412-2 as the interconnection between the second PHY 406-2 and the memory die 408-21. As another example, referring to FIG. 5, the channel controller 502 can characterize or train the second CA bus 512-2 as the interconnection between the second PHY 506-2 and the LP5 508-4. Further, the CA signal may include one or more commands, one or more addresses, and one or more timings or timing skews. In the context of the present example, the CA signal may be transmitted by the second PHY of the multiple PHYs to one of the memory dies (e.g., when the memory die receives the CS signal from a first PHY of the PHYs). The characterizing of the CA bus of the second PHY of the multiple PHYs may include performing a bus training procedure with the memory die. Alternatively, the CC may characterize or train a DQ bus between a PHY of the multiple PHYs and one of the memory dies.

At 910, the memory die receives a DQ signal via a DQ bus of the second PHY of the multiple PHYs. For example, referring to FIG. 5, the LP5 508-4 receives a DQ signal via the second DQ bus 514-4 from the second PHY 506-2 of the multiple PHYs 506. As another example, referring to FIG. 5 when the LP5 508-2 is enabled via the CS bus 510-2 of the second PHY 506-2, the LP5 508-2 receives a DQ signal via the second DQ bus 514-2 from the first PHY 506-1 of the multiple PHYs 506.

At 912, based on the DQ signal, the DQ bus of the second PHY of the multiple PHYs is characterized. For example, referring to FIG. 5, the CC 502 can characterize or train the second DQ bus 514-4 as the interconnection between the second PHY 506-2 and the LP5 508-4 of the LP5s 508. As another example, again referring to FIG. 5, the CC 502 can characterize or train the second DQ bus 514-2 as the interconnection between the first PHY 506-1 to the LP5 508-2 of the LP5s (e.g., enabled by CS signaling on the CS bus 510-2). Further, the DQ signal may include one or more data bits (e.g., four bits, eight bits, 16 bits) and one or more timings or timing skews. The DQ signal may be transmitted by the second PHY of the multiple PHYs to the memory die (e.g., when the memory die receives the CS signal from a first PHY of the PHYs). Additionally, or alternatively, the DQ signal may be transmitted by the memory die to the second PHY of the multiple PHYs. The characterizing of the DQ bus of the second PHY of the multiple PHYs may include performing a DQ bus training procedure. Although shown and described as a sequential set of operations, the training of the CA bus (operation 908) and training of the DQ bus (operation 912) of a memory die may be performed concurrently (e.g., as a combined training operation) or separately (e.g., independently).

FIG. 10 illustrates an example method for preventing a memory die of multiple memory dies from implementing an operation based on a CA signal. In aspects, the memory die of the multiple memory dies may be prevented from implementing or performing an operation while another memory die of the multiple memory dies implements a training procedure with a channel controller. By way of example and in the context of the method 900, another memory die coupled to the first CS bus 412-1 (e.g., memory die 408-N1) may be deselected or idled while the memory controller 404 implements a training procedure with the memory die 408-21. As such, the memory die as described with reference to method 1000 of FIG. 10 may refer to memory die 408-N1 or another die that is disabled or prevented from implementing operations (e.g., when memory die 408-21 or another memory die on the same CS bus is being trained).

At 1002, a first memory die of multiple memory dies receives a CS signal via a CS bus of a first PHY of the multiple PHYs. For example, referring to FIG. 4, the memory die 408-N1 of the multiple memory dies 408 receives a CS signal via the first CS bus 412-1 of the first PHY 406-1 of the multiple PHYs 406. Here, the memory die 408-21 may also receive the CS signal via the first CS bus 412-1 to enable the memory die 408-21 for a training or channel characterization procedure (e.g., as described with reference to FIG. 9). As another example, referring to FIG. 5 when the LP5 508-1 is being trained, the LP5 508-4 of the multiple LP5s 508 receives a CS signal via the first CS bus 510-1 of the first PHY 506-1 of the multiple PHYs 506.

At 1004, the memory die is enabled, based on the CS signal, to receive command and address information. For example, the memory die may receive a command and address from a PHY to which the memory die is coupled via a CA bus. In implementations where the memory die is an active-high memory die, the CS signal may be a one-bit signal that enables the memory die when the bit is a logical one. Alternatively, if the memory die is configured as an active-low memory die, the CS signal may enable the memory die when the bit is a logical zero.

At 1006, the memory die receives a CA signal via a CA bus of a second PHY of the multiple PHYs. For example, referring to FIG. 4, the memory die 408-N1 of the multiple memory dies 408 receives a CA signal via the CA bus 414-N of the PHY 406-N of the multiple PHYs 406. As another example, referring to FIG. 5 and when training the memory die 508-1, the LP5 508-4 of the multiple LP5s 508 receives a CA signal via the second CA bus 514-2 of the second PHY 506-2 of the multiple PHYs 506.

Optionally at 1008, the memory die detects the CA signal via the CA bus of the second PHY of the multiple PHYs as a no-operation command. The CA signal may be a single-bit or multi-bit signal according to a memory specification, such as the LP5 specification. The memory die may detect the CA signal as a no-operation command based on a decoding of the bit values of the CA signal. If at 1008 the memory die detects the CA signal as a no-operation command, then at 1010 the memory die implements or performs a no-operation on the basis of this detection. By so doing, the memory die may be prevented from accessing the CA bus or DQ bus while another memory die on the same CS bus is trained. For example, the memory die 408-N1 may implement a no-operation, such as when the memory die 408-21 implements a training procedure.

Optionally at 1012, the memory die detects the CA signal via the CA bus of the second PHY of the multiple PHYs as a deselect command. The CA signal may be a single-bit or multi-bit signal according to a memory specification, such as the GDDR6 specification. The memory die may detect the CA signal as a deselect command based on a decoding of the bit values of the CA signal. If at 1012 the memory die detects a deselect command, then at 1014 the memory die performs a deselect operation on the basis of this detection. By so doing, the memory die may be prevented from accessing the CA bus or DQ bus while another memory die on the same CS bus is trained. For example, the LP5 508-4 may implement a deselection operation, such as when the LP5 508-1 implements a training procedure.

With reference to the methods 900 and 1000 of FIGS. 9 and 10, respectively, the memory dies coupled to a same CS bus may each receive a same CS signal via the CS bus of one of the multiple PHYs. Thus, each die is enabled to receive command and address information based on the CS signal. With reference to method 900, the memory die receives the CA signal to characterize buses and/or perform a training procedure from another PHY of the multiple PHYS. With reference to method 1000, the memory die receives the CA signal to perform a no-operation or a deselect operation from another PHY of the multiple PHYs. In this way, although both memory dies are enabled to receive commands, only the one die characterizes buses or performs a training procedure while the other die is idle (e.g., performing a no-operation or deselect operation). Furthermore, a CC may be implemented with the first PHY and the second PHY, as well as operably coupled to both memory dies as described herein, to conserve real estate of the CC by including fewer PHYs of a larger width and maintain greater SI through characterizing buses and/or performing training procedures on an individual die-by-die basis enabled by aspects of memory die interconnections to PHYs. For example, two 32-bit PHYs implemented in accordance with aspects described herein consume less real estate of a CC than four 16-bit PHYs typically needed to train individual ×16 memory dies.

For the figures described above, the orders in which operations are shown or described are not intended to be construed as a limitation. Any number or combination of the described operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses, components, or other aspects shown in FIGS. 1 to 8, the components or aspects of which may be further divided, combined, or rearranged. The device and components of these figures generally represent hardware (e.g., electronic devices, packaged modules, CXL modules, IC chips, circuits), firmware or actions thereof, software, or a combination thereof. Thus, these figures illustrate some of many possible systems or apparatuses capable of implementing the described methods.

ADDITIONAL EXAMPLES

In this section, additional examples are provided.

Example 1

An apparatus comprising: at least two physical interfaces (PHYs) comprising a first PHY and a second PHY, each of the at least two PHYs comprising: a chip select (CS) bus; a command-and-address (CA) bus; and at least one data input/output (DQ) bus; and at least one memory die operably coupled to: the first PHY via the CA bus of the first PHY and the at least one DQ bus of the first PHY; and the second PHY via the CS bus of the second PHY.

Example 2

The apparatus of example 1, wherein the at least one memory die comprises a first memory die and the apparatus further comprises a second memory die, the second memory die operably coupled to: the second PHY via the CA bus of the second PHY and the at least one DQ bus of the second PHY; and the first PHY via the CS bus of the first PHY.

Example 3

The apparatus of example 1, further comprising a third memory die, the third memory die operably coupled to: the first PHY via the CA bus of the first PHY, the at least one DQ bus of the first PHY, and the CS bus of the first PHY; or the second PHY via the CA bus of the second PHY, the at least one DQ bus of the second PHY, and the CS bus of the second PHY.

Example 4

The apparatus of example 1, wherein the at least one memory die is not coupled to: the first PHY via the CS bus of the first PHY; or the second PHY via the CA bus of the second PHY and the at least one DQ bus of the second PHY.

Example 5

The apparatus of example 1, wherein: the CS bus is configured as an L-bit bus in which 'L' is greater than or equal to one; the CA bus is configured as an M-bit bus in which 'M' is greater than or equal to one; and the at least one DQ bus is configured as an N-bit bus in which 'N' is greater than or equal to one.

Example 6

The apparatus of example 1, further comprising: at least one memory controller (MC); an interface operably coupled to the MC; and wherein the first PHY and the second PHY are operably coupled to the interface.

Example 7

The apparatus of example 6, wherein the interface comprises a first interface and the apparatus further comprises: at least one channel controller (CC); a second interface operably coupled to the CC; and wherein the at least one MC is operably coupled to the second interface.

Example 8

The apparatus of example 1, wherein: the at least two PHYs comprise N PHYs in which 'N' is greater than or equal to two; the at least one memory die comprise N×N memory dies; and a first N memory dies are operably coupled to the first PHY via the CA bus and the at least one DQ bus of the first PHY; a second N memory dies are operably coupled to the second PHY via the CA bus and the at least one DQ bus of the second PHY; a first memory die of the first N memory dies is operably coupled to the second PHY via the CS bus of the second PHY; and a first memory die of the second N memory dies is operably coupled to the first PHY via the CS bus of the first PHY.

Example 9

The apparatus of example 8, wherein: the at least one DQ bus includes N DQ buses in which 'N' is greater than or equal to two; or the N×N memory dies are packaged together in a stacked-die or linked-die architecture.

Example 10

The apparatus of example 1, wherein: the at least one memory die comprises at least one memory array; the apparatus is configured as one of a Compute Express Link™ (CXL) memory module, a single in-line memory module (SIMM), a dual in-line memory module (DIMM), or a small outline DIMM (SO-DIMM); or the at least one memory die is one of a double data rate (DDR) die, DDR2 die, DDR3 die, DDR4 die, DDR5 die, DDR6 die, synchronous dynamic random-access memory (SDRAM) die, low-power DDR (LPDDR) SDRAM die, graphics DDR (GDDR) SDRAM die, or high-bandwidth memory (HBM) die.

Example 11

A method comprising: receiving, by a memory die of multiple memory dies, a CS signal via a CS bus of a first PHY of multiple PHYs; enabling, based on the CS signal, the memory die to receive commands and addresses; and receiving, by the memory die, a CA signal via a CA bus of a second PHY of the multiple PHYs; and characterizing, based on the CA signal, the CA bus of the second PHY of the multiple PHYs; or receiving, by the memory die, a DQ signal via a DQ bus of the second PHY of the multiple PHYs; and characterizing, based on the DQ signal, the DQ bus of the second PHY of the multiple PHYs.

Example 12

The method of example 11, wherein: the characterizing of the CA bus of the second PHY of the multiple PHYs comprises performing a CA bus training procedure; or the characterizing of the DQ bus of the second PHY of the multiple PHYs comprises performing a DQ bus training procedure.

Example 13

The method of example 11, wherein the memory die comprises a first memory die and the method further comprises: receiving, by a second memory die of the multiple memory dies, a CS signal via a CS bus of the second PHY of the multiple PHYs; enabling, based on the CS signal, the second memory die to receive commands and addresses; and receiving, by the second memory die, a CA signal via a CA bus of the first PHY of the multiple PHYs.

Example 14

The method of example 13, further comprising: detecting, by the second memory die, the CA signal via the CA bus of the first PHY of the multiple PHYs as a no-operation command; and performing, based on the detecting of the no-operation command, a no-operation; or detecting, by the second memory die, the CA signal via the CA bus of the first PHY of the multiple PHYs as a deselect command; and performing, based on the detecting of the deselect command, a deselect operation.

Example 15

An apparatus comprising: a PHY comprising: at least two CS buses comprising a first CS bus and a second CS bus; at least two CA buses comprising a first CA bus and a second CA bus; at least two DQ buses comprising a first DQ bus and a second DQ bus; and at least two memory dies comprising a first memory die and a second memory die, the first memory die operably coupled to the PHY via the first CS bus, the second CA bus, and the second DQ bus; and the second memory die operably coupled to the PHY via the second CS bus, the first CA bus, and the first DQ bus.

Example 16

The apparatus of example 15, wherein: the at least two DQ buses comprise five DQ buses that include the first DQ bus, the second DQ bus, a third DQ bus, a fourth DQ bus, and a fifth DQ bus; and the at least two memory dies comprise 20 memory dies.

Example 17

The apparatus of example 16, wherein: a first 10 memory dies of the 20 memory dies are operably coupled to the PHY via the first CA bus; and a memory dies of the 20 memory dies are operably coupled to the PHY via the second CA bus.

Example 18

The apparatus of example 17, wherein: a first eight memory dies of the first 10 memory dies are operably coupled to the PHY via the first CS bus; a remaining two memory dies of the first 10 memory dies are operably coupled to the PHY via the second CS bus; a first eight memory dies of the memory dies are operably coupled to the PHY via the second CS bus; and a remaining two memory dies of the memory dies are operably coupled to the at least one PHY via the first CS bus.

Example 19

The apparatus of example 17, wherein: a first four memory dies of the first 10 memory dies are operably coupled to the at least one PHY via the first DQ bus; a second four memory dies of the first 10 memory dies are operably coupled to the at least one PHY via the second DQ bus; a remaining two memory dies of the first 10 memory dies are operably coupled to the at least one PHY via the fifth DQ bus; a first four memory dies of the memory dies are operably coupled to the at least one PHY via the third DQ bus; a second four memory dies of the memory dies are operably coupled to the at least one PHY via the fourth DQ bus; and a remaining two memory dies of the memory dies are operably coupled to the at least one PHY via the fifth DQ bus.

Example 20

The apparatus of example 15, wherein: the at least two CS buses are L-bit buses in which 'L' is greater than or equal to one; the at least two CA buses are M-bit buses in which 'M' is greater than or equal to one; and the at least two DQ buses are N-bit buses in which 'N' is greater than or equal to one.

CONCLUSION

Unless context dictates otherwise, use herein of the word "or" may be considered use of an "inclusive or," or a term that permits inclusion or application of one or more items that are linked by the word "or." For example, a phrase "A or B" may be interpreted as permitting just "A," as permitting just "B," or as permitting both "A" and "B." Also, as used herein, a phrase referring to "at least one of" a list of items refers to any combination of those items, including single members of the list. As an example, "at least one of a, b, or c" can cover a, b, c, a-b, a-c, b-c, and a-b-c, as well as any combination with multiples of the same element, such as a-a, a-a-a, a-a-b, a-a-c, a-b-b, a-c-c, b-b, b-b-b, b-b-c, c-c, and c-c-c, or any other ordering of a, b, and c. Further, items represented in the accompanying figures and terms discussed herein may be indicative of one or more items or terms, and thus reference may be made interchangeably to single or plural forms of the items and terms in this written description.

Although implementations of a memory die operably interconnected to PHYs have been described in language specific to certain features or methods, the subject of the appended claims is not limited to the specific features or methods described. Rather, the specific features and methods are disclosed as example implementations of a memory die operably interconnected to PHYs.

What is claimed is:

1. An apparatus comprising:
    at least two physical interfaces (PHYs) comprising a first PHY and a second PHY, each of the at least two PHYs comprising:
        a chip select (CS) bus;
        a command-and-address (CA) bus; and
        at least one data input/output (DQ) bus; and
    at least one memory die operably coupled to:
        the first PHY via the CA bus of the first PHY and the at least one DQ bus of the first PHY; and
        the second PHY via the CS bus of the second PHY.

2. The apparatus of claim 1, wherein the at least one memory die comprises a first memory die and the apparatus further comprises a second memory die, the second memory die operably coupled to:
    the second PHY via the CA bus of the second PHY and the at least one DQ bus of the second PHY; and
    the first PHY via the CS bus of the first PHY.

3. The apparatus of claim 1, further comprising a third memory die, the third memory die operably coupled to:
    the first PHY via the CA bus of the first PHY, the at least one DQ bus of the first PHY, and the CS bus of the first PHY; or
    the second PHY via the CA bus of the second PHY, the at least one DQ bus of the second PHY, and the CS bus of the second PHY.

4. The apparatus of claim 1, wherein the at least one memory die is not coupled to:
    the first PHY via the CS bus of the first PHY; or
    the second PHY via the CA bus of the second PHY and the at least one DQ bus of the second PHY.

5. The apparatus of claim 1, wherein:
    the CS bus is configured as an L-bit bus in which 'L' is greater than or equal to one;
    the CA bus is configured as an M-bit bus in which 'M' is greater than or equal to one; and
    the at least one DQ bus is configured as an N-bit bus in which 'N' is greater than or equal to one.

6. The apparatus of claim 1, further comprising:
    at least one memory controller (MC);
    an interface operably coupled to the MC; and
    wherein the first PHY and the second PHY are operably coupled to the interface.

7. The apparatus of claim 6, wherein the interface comprises a first interface and the apparatus further comprises:
    at least one channel controller (CC);
    a second interface operably coupled to the CC; and
    wherein the at least one MC is operably coupled to the second interface.

8. The apparatus of claim 1, wherein:
    the at least two PHYs comprise N PHYs in which 'N' is greater than or equal to two;
    the at least one memory die comprise N×N memory dies; and
    a first N memory dies are operably coupled to the first PHY via the CA bus and the at least one DQ bus of the first PHY;
    a second N memory dies are operably coupled to the second PHY via the CA bus and the at least one DQ bus of the second PHY;
    a first memory die of the first N memory dies is operably coupled to the second PHY via the CS bus of the second PHY; and
    a first memory die of the second N memory dies is operably coupled to the first PHY via the CS bus of the first PHY.

9. The apparatus of claim 8, wherein:
    the at least one DQ bus includes N DQ buses in which 'N' is greater than or equal to two; or
    the N×N memory dies are packaged together in a stacked-die or linked-die architecture.

10. The apparatus of claim 1, wherein:
    the at least one memory die comprises at least one memory array;
    the apparatus is configured as one of a Compute Express Link™ (CXL) memory module, a single in-line memory module (SIMM), a dual in-line memory module (DIMM), or a small outline DIMM (SO-DIMM); or the at least one memory die is one of a double data rate (DDR) die, DDR2 die, DDR3 die, DDR4 die, DDR5 die, DDR6 die, synchronous dynamic random-access memory (SDRAM) die, low-power DDR (LPDDR) SDRAM die, graphics DDR (GDDR) SDRAM die, or high-bandwidth memory (HBM) die.

11. An apparatus comprising:
a physical interface (PHY) comprising:
  at least two chip select (CS) buses comprising a first CS bus and a second CS bus;
  at least two command address (CA) buses comprising a first CA bus and a second CA bus; and
  at least three data input/output (DQ) buses comprising a first DQ bus, a second DQ bus, and a third DQ bus; and
at least four memory dies comprising a first memory die, a second memory die, a third memory die, and a fourth memory die,
  the first memory die operably coupled to the PHY via the first CS bus, the second CA bus, and the first DQ bus;
  the second memory die operably coupled to the PHY via the second CS bus, the first CA bus, and the first DQ bus;
  the third memory die operably coupled to the PHY via the first CS bus, the first CA bus, and the second DQ bus; and
  the fourth memory die operably coupled to the PHY via the second CS bus, the second CA bus, and the third DQ bus.

12. The apparatus of claim 11, wherein:
the at least three DQ buses comprise five DQ buses that include the first DQ bus, the second DQ bus, the third DQ bus, a fourth DQ bus, and a fifth DQ bus; and
the at least four memory dies comprise 20 memory dies.

13. The apparatus of claim 12, wherein:
a first 10 memory dies of the 20 memory dies are operably coupled to the PHY via the first CA bus; and
a second 10 memory dies of the 20 memory dies are operably coupled to the PHY via the second CA bus.

14. The apparatus of claim 13, wherein:
a first eight memory dies of the first 10 memory dies are operably coupled to the PHY via the first CS bus;
a remaining two memory dies of the first 10 memory dies are operably coupled to the PHY via the second CS bus;
a first eight memory dies of the second 10 memory dies are operably coupled to the PHY via the second CS bus; and
a remaining two memory dies of the second 10 memory dies are operably coupled to the at least one PHY via the first CS bus.

15. The apparatus of claim 13, wherein:
a first four memory dies of the first 10 memory dies are operably coupled to the at least one PHY via the first DQ bus;
a second four memory dies of the first 10 memory dies are operably coupled to the at least one PHY via the second DQ bus;
a remaining two memory dies of the first 10 memory dies are operably coupled to the at least one PHY via the fifth DQ bus;
a first four memory dies of the second 10 memory dies are operably coupled to the at least one PHY via the third DQ bus;
a second four memory dies of the second 10 memory dies are operably coupled to the at least one PHY via the fourth DQ bus; and
a remaining two memory dies of the second 10 memory dies are operably coupled to the at least one PHY via the fifth DQ bus.

16. The apparatus of claim 11, wherein:
the at least two CS buses are L-bit buses in which 'L' is greater than or equal to one;
the at least two CA buses are M-bit buses in which 'M' is greater than or equal to one; and
the at least three DQ buses are N-bit buses in which 'N' is greater than or equal to one.

17. The apparatus of claim 11, wherein:
the at least three DQ buses comprise four DQ buses that include the first DQ bus, the second DQ bus, the third DQ bus, and a fourth DQ bus; and
the at least four memory dies comprise five memory dies that include the first memory die, the second memory die, the third memory die, the fourth memory die, and a fifth memory die,
  the fifth memory die operably coupled to the PHY via the first CS bus, the first CA bus, and the fourth DQ bus.

18. The apparatus of claim 11, wherein:
the at least three DQ buses comprise four DQ buses that include the first DQ bus, the second DQ bus, the third DQ bus, and a fourth DQ bus; and
the at least four memory dies comprise five memory dies that include the first memory die, the second memory die, the third memory die, the fourth memory die, and a fifth memory die,
  the fifth memory die operably coupled to the PHY via the second CS bus, the second CA bus, and the fourth DQ bus.

19. The apparatus of claim 11, wherein:
the at least three DQ buses comprise five DQ buses that include the first DQ bus, the second DQ bus, the third DQ bus, a fourth DQ bus, and a fifth DQ bus; and
the at least four memory dies comprise six memory dies that include the first memory die, the second memory die, the third memory die, the fourth memory die, a fifth memory die, and a sixth memory die,
  the fifth memory die operably coupled to the PHY via the first CS bus, the first CA bus, and the fourth DQ bus; and
  the sixth memory die operably coupled to the PHY via the second CS bus, the second CA bus, and the fifth DQ bus.

20. The apparatus of claim 11, wherein:
the at least four memory dies comprise six memory dies that include the first memory die, the second memory die, the third memory die, the fourth memory die, a fifth memory die, and a sixth memory die,
  the fifth memory die operably coupled to the PHY via the second CS bus, the first CA bus, and the first DQ bus; and
  the sixth memory die operably coupled to the PHY via the first CS bus, the second CA bus, and the first DQ bus.

* * * * *